Oct. 21, 1969      C. MERIAM      3,473,387
FLUID CHARACTERISTIC MEASURING INSTRUMENT
Filed June 19, 1967      2 Sheets-Sheet 1
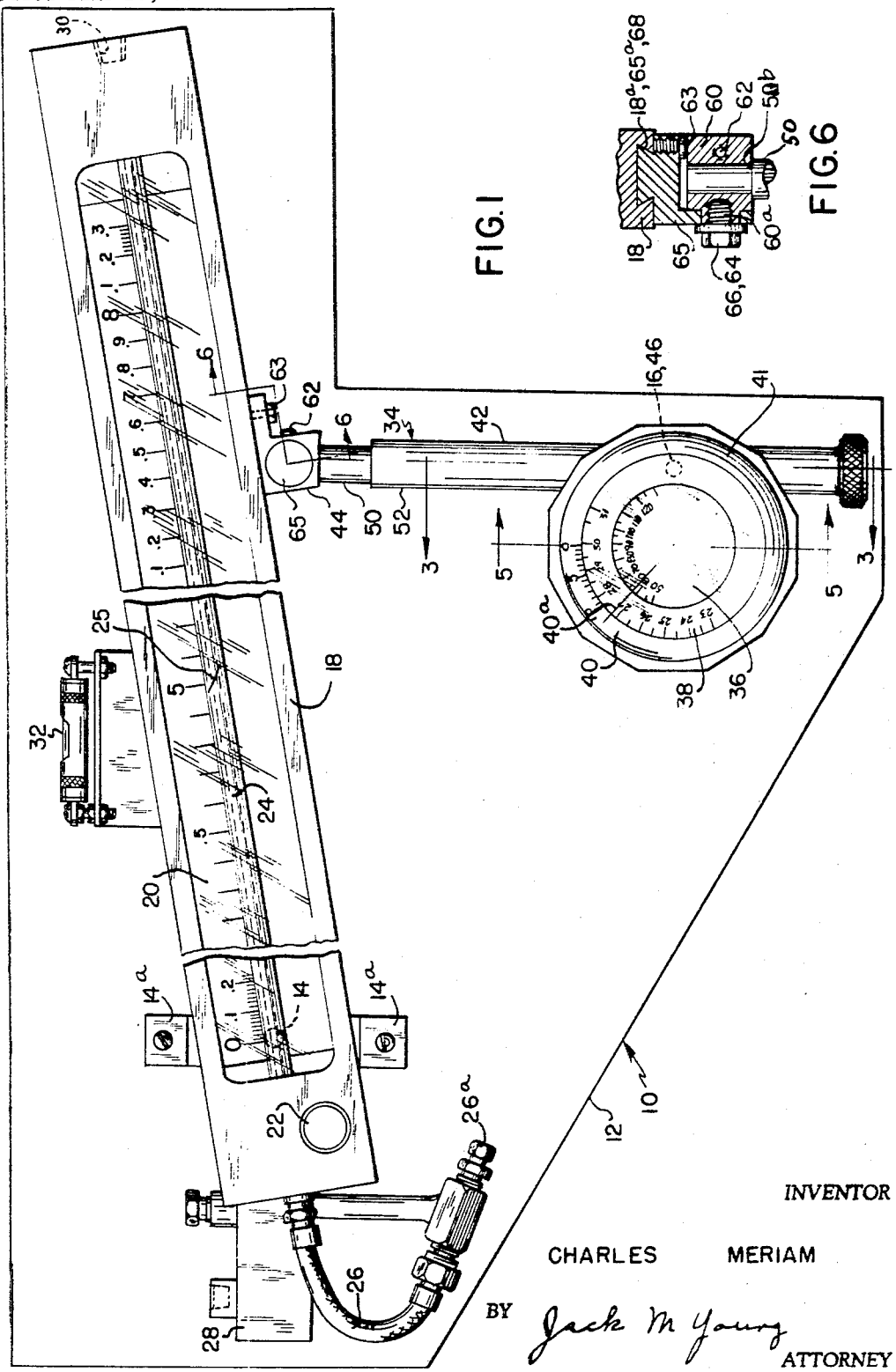
INVENTOR
CHARLES MERIAM
BY Jack M. Young
ATTORNEY

INVENTOR

CHARLES MERIAM

BY Jack M Young
ATTORNEY

United States Patent Office
3,473,387
Patented Oct. 21, 1969

3,473,387
FLUID CHARACTERISTIC MEASURING INSTRUMENT
Charles Meriam, Lakewood, Ohio, assignor to The Meriam Instrument Company, Cleveland, Ohio, a corporation of Ohio
Filed June 19, 1967, Ser. No. 646,808
Int. Cl. G01l 7/18
U.S. Cl. 73—401                                              12 Claims

ABSTRACT OF THE DISCLOSURE

An inclined-manometer-type of fluid characteristic measuring instrument is responsive to pressure sensing for directly reading volume, weight or velocity of flow, or differential pressure across a flow measuring orifice, nozzle, venturi or laminar flow element or for directly reading static head, velocity head or total head fluid pressure. Adjustments are provided for correcting the instrument reading measurements for variations in fluid measurement conditions, including temperature of, density of, viscosity of, barometric pressure on, humidity of, mixture of fluids in, etc. of the fluid being measured; temperature, etc. of the manometer liquid; etc.

BACKGROUND AND SUMMARY OF THE INVENTION

This invention relates to U-tube-type or manometer type liquid column fluid pressure gauges having compensation for variations in fluid measurement conditions, including barometric pressure, temperature, etc.

This instrument has many applications. The fluid characteristic measuring instrument disclosed herein can be used in place of the U-tube manometer in the G. H. Millar, U.S. Patent No. 3,123,900 entitled "Method of Manufacture of a Flow Element or Pulsation Dampener." There, it would be measuring differential pressure as a differential manometer across a laminar flow element. This instrument can also be used to measure the differential pressure across a nozzle, orifice or venturi, instead of this laminar flow element. In FIG. 1 of the present application, an instrument is disclosed as being an open ended manometer since the right end thereof is not connected to the downstream end of the flow measuring nozzle, laminar flow element, etc. but is described herein as capable of being used as a differential manometer.

The word "fluid" is herein defined as including liquid, gas, or any mixture thereof.

In metering or measuring fluid characteristics, variations in fluid measurement conditions will affect the direct reading of this instrument. These fluid measurement conditions are herein defined as including temperature of, density of, viscosity of, barometric pressure on, humidity of, or mixture of fluids in, etc. the fluid being measured; temperature, etc. of the manometer liquid; etc. Each of these conditions have a complex effect on measurement of fluid characteristics, herein defined as any of the following characteristics directedly readable by this instrument: (1) volume, weight or velocity of flowing fluid; (2) differential pressure across a fluid flow measuring orifice or laminar flow element, or (3) static head, velocity head, or total head (static plus velocity head pressures) fluid pressure. The instrument may be used to measure static head pressure in calibrating an airplane altimeter or rate of climb indicator, manifold pressure gauge for an internal combustion engine, or depth gauge of liquid in a tank.

Various attempts have been made in the past to solve these complex conditions, and applicant here seeks to disclose a structure for compensating for all of these conditions. However, most of the description relates to temperature and barometric pressure compensation for flowing fluid measurement, but it should be understood that these are only chosen as examples for purposes of illustration and the compensation for other conditions and measurement of other fluid characteristics will also be described.

For example, when the temperature of the flowing fluid being measured increases, the velocity of the fluid increases to in turn increase the reading on the manometer. The present invention permits adjustment of the manometer to compensate for this error so that the manometer will read accurately for this difference in temperature as well as all the other conditions mentioned in the preceding paragraph.

An object of the present invention is to provide a manometer-type fluid characteristic measuring instrument adjustable to compensate or correct the reading measurement thereon for variations in any of the fluid flow measurement conditions mentioned herein.

A further object of the present invention is to provide a fluid characteristic measuring instrument characterized by the ease of assembly of its component parts, structural simplicity, multiplicity of compensation adjustments, strong and sturdy nature, operating efficiency, and ease of operation or use.

Other objects, novel features and additional advantages of the present invention will become more fully apparent from the appended claims and as the detailed description and discussion hereafter proceeds in conjunction with the accompanying drawing.

BRIEF DESCRIPTION OF THE DRAWING

In the drawing:
FIG. 1 is a front view of an inclined manometer-type fluid characteristic measuring instrument of the present invention with the manometer scale broken at two places along its length;
FIG. 6 is a vertical sectional view taken generally along the line 6—6 in FIG. 1.

DETAILED DESCRIPTION OF THE PREFERRED EMBODIMENTS

Figure 5:
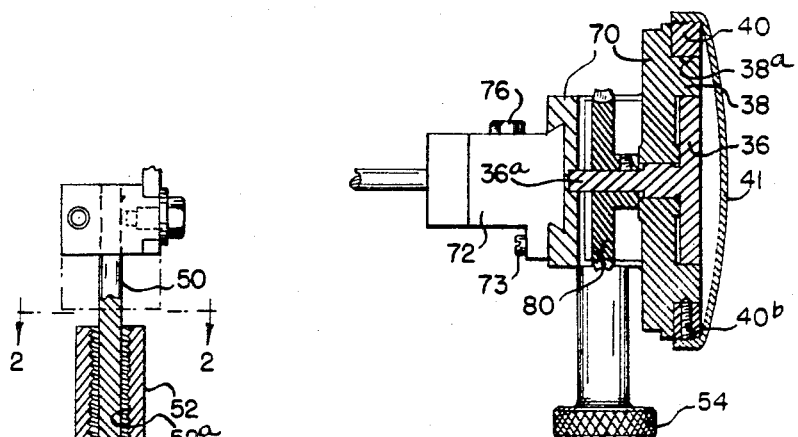
FIG. 5 is a vertical view, partially in section, taken generally along the line 5—5 in FIG. 1.
Figures 3, 4:
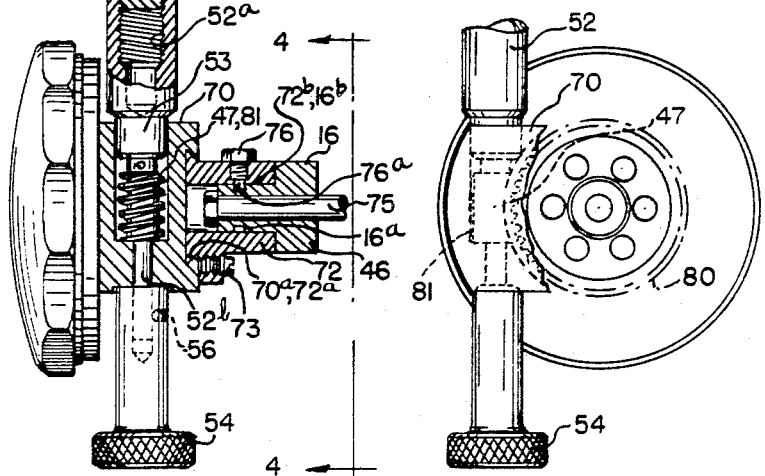
FIG. 3 is a vertical longitudinal view, partially in section, taken generally along the line 3—3 in FIG. 1.
FIG. 4 is a vertical view, taken generally along the line 4—4 in FIG. 3, with a portion of the lower connecting means broken away for clarity of illustration.
Figure 2:
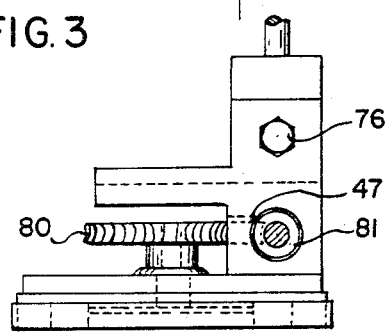
FIG. 2 is a top plan view of a portion of the adjusting means taken generally along the line 2—2 in FIG. 3.

FIGS. 1-6 of the drawing disclose an inclined manometer-type fluid characteristic measuring instrument 10 response to pressure sensing.

These fluid characteristics may be any one of many types, including volume of fluid flow, weight of fluid flow, velocity of fluid flow, pressure differential, or static, velocity or total head fluid pressure.

A flat backing plate or base element 12 is provided to which is secured the remainder of the instrument by pins 14 and 16 in FIG. 1.

Instrument 10 includes case 18 pivotally secured to instrument panel plate or base element 12 by pivot pin 14 connecting case 18 to pivot pin mounting bracket 14a secured to base element 12 as an operative connection therebetween. Case 18 has scale element 20 endwise adjustable within case 18 by "zero" adjustment knob 22 to bring the zero position of the scale at pivot pin 14 or into any other desirable position. A manometer leg, formed by glass tube 24, is rigidly carried within case 18 with scale element 20 operatively associated therewith for providing a reading measurement on the scale element 20 of the fluid charcteristic by liquid level 25 of the fluid characteristic measuring liquid in the manometer leg 24.

Manometer leg 24 is inclined in the conventional manner to increase the accuracy of the instrument by spreading, for example, a 6 inch vertical manometer leg over a 48 inch inclined scale.

Case 18 includes other well known manometer structure. This includes flexible tube 26 connectable by its free end 26a to a pressure tap on the upstream side of the flow measuring orifice or laminar element and having its opposite end connected to the left end of manometer leg 24, manometer liquid well 28 for supplying liquid to manometer leg 24, connection 30 at the right end of manometer leg glass tube 24 for connection by suitable hose to the pressure tap on the downstream side of the flow measuring orifice or laminar element from tube end 26a to form a differential manometer or to be exposed to atmospheric pressure in a conventional manometer, and a liquid level 32 for establishing the inclination of manometer leg 24 for calibration against a known flow standard when the inclined manometer leg 24 is tilted until level 32 indicates a level, horizontal position.

Scale element 20 may have any suitable number scale arrangement thereon, such as linear, square root, logarithm, etc. If a laminar flow element is used, a linear scale can be used to measure volume, weight or velocity of flow; or to measure inches of static, velocity or total head pressure or differential pressure across the laminar flow element. If a nozzle, venturi or orifice plate is used, scale 20 can be calibrated in square root for measuring volume, weight or velocity of fluid flow; and calibrated linearly for measuring inches of static, velocity or total head pressure or differential water pressure across the orifice, etc. Each is a pressure type or pressure responsive fluid characteristic measurement.

Vernier-type adjustment means 34 in FIG. 1 operatively connects base element 12 and case 18 containing scale element 20, and is adjustable for changing the relative position of the elements (inclination of manometer leg 24 and scale element 20 relative to the horizontal) to correct its reading measurement at manometer liquid level 25 for variations in fluid measurement conditions.

These fluid measurement conditions include temperature of, density of, viscosity of, barometric pressure on, humidity of, mixture of fluids in, etc. of the fluid being measured; temperature, etc. of the liquid in the manometer; etc.

Adjustment means 34 includes left pivot pin 14 in FIG. 1; a plurality of relatively rotatable indicator members 36, 38 and 40, here shown respectively as temperature, barometric pressure and vernier scales, and here movable for changing the inclination of manometer leg 24 to accommodate different fluid measurement conditions; suitable connection means hereafter described operatively connected to said indicator members and elements for changing the relative position of the elements 12 and 20 in response to relative movement of indicator members 36, 38 and 40; extensible link 42 connected by upper connecting means 44 to manometer case 18 and by lower connecting means 46 to base element 12; and a worm 60 and worm wheel drive 47 for transmitting the change in length of the extensible link 42 into change in relative positions of indicator members 36, 38 and 40.

The mode of operation of this instrument will be briefly described. Manometer case 18 and link 42 are pivotally connected at upper connecting means 44 and are respectively connected by pins 14 and 16 to base element or plate 12 to provide a triangular structure having vertices 14, 16 and 44. As the length of link 42 is changed by adjusting indicator members 36, 38 and 40 and rotating knob 54, the tilt of manometer leg 24 is changed to compensate for the variations in fluid measurement conditions being compensated for so that liquid level 25 will read directly on scale 20 an accurate fluid measurement reading.

Extensible link 42 includes a screwed together and coacting screw part 50 within nut part 52 rotatably driven by finger knob 54. Knob 54 is secured by set screw 56 to stem 52b of nut part 52. Screw part 50 has threads 50a only along a short length of a swab-type head travelable along the length of threaded bore 52a in nut part 52. Threads 50a and 52a of respective parts 50 and 52 permit upon rotation of knob 54 extension or contraction of link 42 along its longitudinal central axis.

Two connecting means, upper connecting means 44 and lower connecting means 46, operatively connect respectively screw part 50 and nut part 52 to manometer case 18 and base element 12 at points based apart along the axis of extensible link 42.

Upper connecting means 44 in FIGS. 1 and 6 include split block 60 detachably secured to the upper end of screw part 50 by clamp screw 62. Pivot block 65 has a bore telescoped over pivot shoulder 60a on block 60 and held thereon by screw and washer assembly 64 to provide a pivoting connection 66. Dovetails 18a and 65a are provided in manometer case 18 and pivot block 65 to provide a sliding connection 68 to permit sliding of block 65 along the length of manometer leg 24 on scale case 18. Clamp screw 63 may be tightened to lock the dovetails against sliding at sliding connection 68. Hence, upper connecting means 44 has sliding connection 68 and pivoting connection 66 with manometer case 18.

Lower connecting means 46 is shown in FIGS. 1, 2, 3 and 5. Stem 52b in bearing 53 rotatably mounts nut part 52 in the bore of housing 70. Sleeve 72 is slidably secured to housing 70 by dovetails 72a and 70a on these respective parts with this sliding connection adapted to be secured in any given location to rigidly secure housing 70 and sleeve 72 together by tightening clamp screw 73. Pivot pin 16 is rigidly secured against rotation to base element 12 by clamp screw 75. Cylindrical portions 16b and 72b respectively on pin 16 and sleeve 72 permit relative rotational movement therebetween about the axis of clamp screw 75 since screw 76 has a cylindrical tip 76a located in annular groove 16a of pin 16. If screw 76 is tightened down more firmly, or if a longer screw is used, tip 76a can lock sleeve 72 against rotation on pin 16.

In adjusting instrument 10 for variations in different type fluid measurement conditions, it is desirable to provide many different types of adjusting movements described in this paragraph. For different fluid measuring conditions, it is desirable to provide a different angular movement of manometer leg 24 about pivot 14 (to raise or lower the right end of manometer leg 24) for a given degree of rotational movement of knob 54. Four different types of movements are provided by four different linkages IA, IB, IIA, and IIB broken down into their four components, as follows:

Linkage I

Here, lower connecting means 46 is locked against pivotal movement and upper connecting means 44 is permitted to slide and pivot. Now, screw 76 is tightened, or longer screw 76 is inserted, as a locking means to lock pin 16 and sleeve 72 together against relative rotation; and clamp screw 63 is loosened so sliding connection 68 is free to slide and pivoting connection 66 is free to pivot upon change in length of link 42 by rotation of knob 54 since pivots 16 and 66 are parallel. Also, it should be noted that the angular inclination of link 42 in FIG. 1 may be changed by tightening screw 76 at a different place in groove 16a to locate block 65 at a different place along dovetail 18a; this will give a different shaped triangle between pivots 14, 16 and 66 and a different compensation to manometer leg 24 per change in length of link 42. Hence, sliding connection 68 and pivoting connection 66 operatively connect indicator members 36, 38 and 40 to scale element 20.

Linkage II

Upper and lower connecting means 44 and 46 each have only a pivotal connection. Now upper sliding connection 68 is locked by tightening clamp screws 63, and a pivoting connection is provided in lower connecting means 46 by either loosening screw 76 so that its tip 76a is free to travel in annular groove 16a or by providing a shorter screw 76. Now, we have two spaced apart pivots 66 and 16 operatively connecting indicator members 36, 38 and 40 to respectively scale element 20 and base element 12.

Linkage A

Here, pivoting connection 66 and pin 16 are located coaxial with the axis of link 42, as illustrated in FIG. 1.

Linkage B

Here, upper pivoting connection 66 is coaxial with the axis of link 42, as shown in FIG. 1, while the axis of pin 16 in lower connecting means 46 is offset relative to the axis of link 42. Any suitable amount of offset desired is easily achieved by loosening clamp screw 73 in FIG. 3, sliding housing 70 relative to sleeve 72 by dovetails 70a and 72a as an adjustment means to move lower connecting means non-parallel to the axis of link 42 to a different position of offset relative to that link axis, and then tightening clamp screw 73 to lock this new position.

Hence, we can pick any of four different conditions: Linkage IA, linkage IB, linkage IIA, or linkage IIB and will get four different degrees of movement of manometer leg 24 for a given rotation of knob 54. For example, linkage IA meets the description of both linkages I and A. With linkage I, the length of the hypotenuse and right hand leg of the triangle are simultaneously changed upon rotation of knob 54. In linkage II, only the right hand leg is changed in length upon rotation of knob 54. In linkage A, all of the change in length of link 42 during rotation of knob 54 is transmitted to upper connecting means 44 as a linear relation of the relative axial movement of the nut and screw parts 50 and 52. In linkage B, a greater movement is transmitted between pin 16 and pivoting connection 66 than the change in length of the screw and nut parts 50 and 52 since the screw and nut parts form only one leg of a new triangle with the distance between pin 16 and pivoting connection 66 forming the hypotenuse. This linkage makes it possible to bring in constants and squares (to compensate for the different fluid flow measurement conditions) in view of the Pythagorean theorem on triangles with the value of the components determined by the amount of offset selected.

It should be readily apparent that alternate constructions come within the scope of the present invention. First, dovetails 70a, 72a are shown as extending approximately perpendicular to the axis of link 42 but may be extended at any acute angular relationship with clamp screw 75 and pivoting connection 66 remaining parallel to each other. Then, the effect of the movement of knob 54 upon manometer leg 24 will be different because a different shape triangle will appear in linkage B wherein link 42 may be either the hypotenuse or side of the triangle. Second, although a universal construction is illustrated, some of the component parts may be made solid for different linkages. For example, in linkage I, pin 16 and sleeve 72 may be made in one piece and screw 76 eliminated; in linkage II, block 65 and case 18 may be made in one piece with screw 63 and dovetails 18a and 65a eliminated; and in linkage A or B, housing 70 and sleeve 72 may be made in one piece with dovetails 70a, 72a and screw 73 eliminated with the axis of screw 75 on the axis of link 42 in linkage A or offset in linkage B.

The adjustment in length of link 42 is indicated by relative location of movable indicator members 36, 38 and 40 in FIGS. 1 and 5 having thereon fluid measurement condition scales. Dial or indicator members 36, 38 and 40 have thereon relatively rotatable, concentric scales respectively having thereon temperature, barometric pressure and vernier scales with member 40 also carrying a radially extending indicator or hair line 40a to provide with the vernier a more accurate adjustment. Outer dial member 40 is rotatable through 360° movement on the periphery of middle dial member 38, which is formed integral with housing 70. Dial member 40 is rotatably held on member 38 by a radial screw 40b in member 40 traveling in an annular groove 38a in member 38. A transparent face 41 is secured to member 40. Inner dial member 36 has a shaft portion 36a having detachably secured thereto by a set screw worm wheel 80 drivingly connected with worm 81 in worm and worm wheel drive 47. The portions of shaft portion 36a straddling worm wheel 80 are rotatably mounted in housing 70. Hence, rotation of knob 54 not only changes the length of link 42 to raise or lower the right end of manometer leg 24 but also rotates dial member 36 relative to the other indicator members 38 and 40. Hence, this worm and worm wheel drive 47 is operatively connected with indicator member 38 between nut part 52 and base element 12 so that relative rotation of screw and nut parts 50 and 52 change the relative position of manometer leg 24 on base element 12 and cause relative rotation of indicator members 36 and 38. Threads 50a and 52a and worm 81 and worm wheel 80 are constructed so that they are irreversible by vibration encountered during fluid characteristic measurement and can only be moved by rotation of knob 54.

The mode of operation of measuring instrument 10 will be described in the following numbered paragraphs.

First, the desired aforedescribed Linkage IA, IB, IIA, or IIB and desired offset dimension is selected after considering the different fluid measurement conditions involved in the fluid measuring application involved, such as the conditions: density of, viscosity of, humidity of, mixture of fluids in, etc. the fluid being measured; the temperature, etc. of the manometer liquid 25; etc. Then, the proper parts are adjusted to give the linkage and offset desired. This can be determined theoretically or by practical tests.

Second, instrument 10 is adjusted to a "zero" position. The instrument is set at any selected arbitrary standard setting, such as 29.92 inches of barometric pressure and 70° F. by rotating scale member 40 to the 29.92 position relative to scale member 38, and then rotating knob 54 until temperature 70° F. on dial 36 is under hairline 40a. Then, clamp screw 62 is released so that screw part 50 can be rotated in nut part 52 (while split block 60 rests on shoulder 50b of part 50) until level 32 shows a level condition. Screw 62 is then tightened before the instrument 10 is further used. Then, well 28 is filled with liquid until manometer liquid meniscus 25 is approximately at the zero position while pivot 14 is located at the "0" position. If any slight adjustment is necessary, "zero" adjustment knob 22 may be rotated. Although pivot 14 need not be exactly at the "zero position," it is preferably located there.

Third, instrument 10 is tested on different flow quantities, velocities or differential pressures or on different static, velocity or total head fluid pressures and at different temperature and barometric conditions to be sure that scale element 20 will accurately read directly. If a change in calibration is necessary, it is possible to provide different calibration scales on member 36, 38 or 40; change the choice of the four different linkages aforedescribed; and/or change the offset of pin 16 relative to the axis of link 42.

Fourth, instrument 10 is either (1) shipped with base element 12 to the customer or (2) is removed from the manufacturer's base element 12 and shipped to the customer without base element 12. In this second situation, the customer is given accurate dimensions for the mounting holes of pivot pin 14, pivot pin mounting bracket 14a, and pin 16 so that he can mount instrument 10 in the same position on his own base element or panel plate. If scale members 36, 38 and 40 at 70° F. and 29.92 inches of barometer pressure do not then exactly yield a horizontal position for level 32, clamp screw 62 may be loosened and screw part 50 rotated slightly in nut part 52 (while supporting split block 60 on shoulder 50b) until the desired horizontal position is obtained. Then, of course, screw 62 is tightened before the instrument 10 is further used.

Fifth, now instrument 10 is ready to be used to measure fluid characteristics by pressure sensing. The user determines the temperature of and barometric pressure on the fluid being measured and then sets vernier scale member 40 on scale member 38 to the proper barometric pressure. Then, the user rotates knob 54 until this temperature on scale member 36 is under radially extending hairline 40a on member 40. This rotation of knob 54 simultaneously rotates (1) inner scale dial member 36 through worm 81 and worm wheel 80, and (2) correspondingly changes the length of link 42 between upper and lower connecting means 44 and 46 by rotating nut part 52 on non-rotatable screw part 50. The right end of manometer leg 24 is raised for increase in temperature and is raised for decrease in barometric pressure.

The graduations on scale members 36 and 38 can be generally equally spaced and linearly arranged since instrument 10 operates over a small range with absolute temperatures and absolute pressures being involved, but may have different spacing if the fluid measurement conditions so require.

This instrument 10 in effect changes the density of the fluid (after it has been effected by temperature and barometric pressure change from standard) back to the standard by rotation of knob 54 to compensate for temperature and barometric pressure encountered after earlier compensating for humidity, viscosity, etc. Then, instrument 10 reads directly by liquid level 25 on scale element 20 in volume, weight, or velocity of flow; in inches of differential water pressure across the flow orifice or laminar element; or in inches of static, velocity or total head pressure.

Instrument 10 has numerous advantages, some of which are given in the hereinafter numbered paragraphs.

First, the dial, comprising scale members 36, 38 and 40, is easily readable and permits easy adjustment of instrument 10.

Second, different fluid measurement conditions can be compensated for, including temperature of, density of, viscosity of, barometric pressure on, humidity of, mixture of fluids in, etc. of the fluid being measured; the temperature, etc. of liquid 25 in manometer leg 24; etc.

Third, any recalibration of scale members 36, 38 and 40 is easily made if required by differences in fluid measurement conditions or in changes in the measuring system, such as a change from the English system having inches and Fahrenheit degrees to the metric system having milimeters and centigrade degrees. For example, a simple master may be laid out on drawing paper and then photographically reproduced on the face of scale member 38. Different masters may be made for different fluid measurement conditions or when using different measuring systems while the same threads 50a and 52a are used.

Fourth, the barometric pressure can be accurately set by use of vernier indicator member 40.

Fifth, vibration cannot change the calibration setting of the instrument because of the irreversible driving action of the form wheel 80 and worm 81 and of screw part 50 and nut part 52.

It should be readily apparent that alternate constructions come within the scope of the present invention. Here, after rotation of knob 54 and of scale member 36 relative to scale member 38, the inclination of manometer leg 24 is changed. However, this invention is intended to include in its broadest aspects that, instead of manometer leg 24 being changed in inclination, scale element 20 can be moved relative to manometer leg 24 for correcting the reading measurement by the meniscus 25 of the manometer liquid for variations in fluid measurement conditions. Then, the scale graduations are actuely inclined relative to the direction of movement so each scale graduation moves along the manometer leg during this movement relative to the manometer liquid level. However, the illustrated construction is the preferred construction because such scale movement requires the use of an expensive to manufacturer special scales wherein the indicator lines thereon are accurately drawn along different curves with respect to manometer leg 24, as is well known in the art.

The invention may be embodied in other specific forms without departing from the spirit or essential characteristics thereof. The present emodiments are therefore to be considered in all respects as illustrative and not restrictive and all changes which come within the meaning and range of equivalency are therefore intended to be embraced therein.

What is claimed and desired to be secured by U.S. Letters Patent is:

I claim:

1. A manometer-type fluid characteristic measuring instrument, comprising:

a base element, a manometer leg having fluid characteristic measuring liquid therein responsive to fluid pressure and being operatively connected to said base element, a scale element operative associated with said manometer leg for providing a reading measurement on said scale element of the fluid characteristic by the liquid level in said manometer leg, and adjustment means operatively connecting said elements and adjustable for changing the relative position of said elements to correct this reading measurement for variations in fluid measurement conditions;

said adjustment means including:

a plurality of relatively movable indicator members having at least one fluid measurement condition scale, and connection means operatively connected to said indicator members and said elements for changing the relative position of said elements in response to relative movement of said indicator members;

said indicator members including three relatively rotatable concentric scales with each of two of said scales having thereon a different fluid measurement condition, the third scale coacting with the other two scales to provide a more accurate adjustment.

2. A manometer-type fluid characteristic measuring instrument, comprising:

a base element, a manometer leg having fluid characteristic measuring liquid therein responsive to fluid pressure and being operatively connected to said base element, a scale element operative associated with said manometer leg for providing a reading measurement on said scale element of the fluid characteristic by the liquid level in said manometer leg, and adjustment means operatively connecting said elements and adjustable for changing the relative position of said elements to correct this reading measurement for variations in fluid measurement conditions;

said adjustment means including:

a plurality of relatively movable indicator members having at least one fluid measurement condition scale, and connection means operatively connected to said indicator members and said elements for changing the relative position of said elements in response to relative movement of said indicator members;

said connection means including two spaced part pivots with one pivot operatively connecting said indicator members to each of said elements.

3. A manometer-type fluid characteristic measuring instrument, comprising:
a base element,
a manometer leg having fluid characteristic measuring liquid therein responsive to fluid pressure and being operatively connected to said base element,
a scale element operative associated with said manometer leg for providing a reading measurement on said scale element of the fluid characteristic by the liquid level in said manometer leg, and
adjustment means operatively connecting said elements and adjustable for changing the relative position of said elements to correct this reading measurement for variations in fluid measurement conditions;
said adjustment means including:
a plurality of relatively movable indicator members having at least one fluid measurement condition scale, and
connection means operatively connected to said indicator members and said elements for changing the relative position of said elements in response to relative movement of said indicator members;
said connection means including a sliding connection operatively connecting said indicator members to one of said elements.

4. A manometer-type fluid characteristic measuring instrument, comprising:
a base element,
a manometer leg having fluid characteristic measuring liquid therein responsive to fluid pressure and being operatively connected to said base element,
a scale element operative associated with said manometer leg for providing a reading measurement on said scale element of the fluid characteristic by the liquid level in said manometer leg, and
adjustment means operatively connecting said elements and adjustable for changing the relative position of said elements to correct this reading measurement for variations in fluid measurement conditions;
said adjustment means including:
a plurality of relatively movable indicator members having at least one fluid measurement condition scale, and
connection means operatively connected to said indicator members and said elements for changing the relative position of said elements in response to relative movement of said indicator members;
said connection means including an extensible link extensible and contractable along and axis, and including two connecting means operatively connecting said link to the respective elements at points spaced apart along the axis.

5. An instrument, as set forth in claim 4, with:
said extensible link including coacting screw part and nut part,
one of said parts being operatively connectable to one of said elements,
said connection means including a worm and worm wheel drive operatively connectable with said indicator members between the other part and other element so that relative rotation of said parts to change the relative position of said elements causes relative rotation of said indicator members,
said drive worm and worm wheel being constructed to be irreversible by vibration encountered during fluid characteristic measurement.

6. An instrument, as set forth in claim 4, with each connecting means being a pivot connection with said pivot connections being coaxal with the axis of said link.

7. An instrument, as set forth in claim 4, with:
one of said connecting means being a pivot connection coaxial with the axis of said link, and
the other of said connecting means being offset relative to said axis.

8. An instrument, as set forth in claim 4, with one of said connecting means being a pivot connection coaxial with the axis of said link.

9. An instrument, as set forth in claim 9, with:
one of said connecting means being a combined pivot connection and sliding connection,
the other of said connecting means being a parallel pivot with means for locking said last mentioned pivot in any one sliding positions assumed by said sliding connection.

10. An instrument, as set forth in claim 4, with:
one of said connecting means being a pivot fixed relative to the axis of said link, and
adjusting means for permitting movement of the other of said connecting means non-parallel to said axis to a choice of different positions located different fixed distances offset relative to said axis.

11. An instrument, as set forth in claim 4, with:
said manometer leg being inclined with respect to the horizontal,
said scale element and manometer leg being rigidly connected together to be moved by said adjustment means as a unit relative to said base element to change the tilt of said manometer leg,
at least one of said connecting means including a sliding and pivoting connection with said scale element.

12. A manometer-type fluid characteristic measuring instrument, comprising:
a base element,
a manometer leg having fluid characteristic measuring liquid therein responsive to fluid pressure and being operatively connected to said base element,
a scale element operative associated with said manometer leg for providing a reading measurement on said scale element of the fluid characteristic by the liquid level in said manometer leg,
adjustment means operatively connecting said elements and adjustable for changing the relative position of said elements to correct this reading measurement for variations in fluid measurement conditions,
said manometer leg being inclined with respect to the horizontal,
said scale element and manometer leg being rigidly connected together to be moved by said adjustment means as a unit relative to said base element to change the tilt of said manometer leg,
a plurality of relatively movable indicator members,
connection means operatively connecting said indicator members and elements for changing the relative position of said elements in response to relative movement of said indicator members,
said indicator members including three relative rotatable concentric scales having temperature and barometric pressures thereon,
the third scale having a vernier coacting with the other two scales to provide a more accurate adjustment,
said connection means including an extensible link extendable and contractable along an axis and including two connecting means operatively connected to the respective elements as points spaced apart along the axis,
said extensible link including a coacting screw part and nut part,
one of said parts being operatively connectible to one of said elements,
said connection means including a worm and worm wheel drive operatively connected with said indicator members between the other part and other element so that relative rotation of said parts to change the relative positions of said elements causes relative rotation of said indicator members, said drive worm and worm wheel being constructed to be irreversible by vibration encountered during fluid characteristic measurement.

References Cited

UNITED STATES PATENTS

| | | | |
|---|---|---|---|
| 1,268,292 | 6/1918 | Stancliffee | 73—401 XR |
| 1,352,038 | 9/1920 | Szekely | 73—401 |
| 1,506,943 | 9/1924 | Reed | 73—393 XR |
| 1,578,440 | 3/1926 | Hoffman | 73—401 |
| 1,584,860 | 5/1926 | Huff | 73—393 XR |
| 3,182,509 | 5/1965 | Kendall et al. | 73—393 |

LOUIS R. PRINCE, Primary Examiner

D. O. WOODIEL, Assistant Examiner

U.S. Cl. X.R.

73—393

PO-1050
(5/69)

UNITED STATES PATENT OFFICE

CERTIFICATE OF CORRECTION

Patent No. 3,473,387　　　　　　　　　　Dated October 21, 1969 page 1 of 2

Inventor(s) Charles Meriam

It is certified that error appears in the above-identified patent and that said Letters Patent are hereby corrected as shown below:

Column 1, line 37, "Millar," should be -- Miller --. Column 4, line 52 to Column 5, line 25, "components ... and" should be -- components, as follows:

Linkage I: Here, lower connecting means 46 is locked against pivotal movement and upper connecting means 44 is permitted to slide and pivot. Now, screw 76 is tightened, or longer screw 76 is inserted, as a locking means to lock pin 16 and sleeve 72 together against relative rotation; and clamp screw 63 is loosened so sliding connection 68 is free to slide and pivoting connection 66 is free to pivot upon change in length of link 42 by rotation of knob 54 since pivots 16 and 66 are parallel. Also, it should be noted that the angular inclination of link 42 in FIG. 1 may be changed by tightening screw 76 at a different place in groove 16a to locate block 65 at a different place along dovetail 18a; this will give a different shaped triangle between pivots 14, 16 and 66 and a different compensation to manometer leg 24 per change in length of link 42. Hence, sliding connection 68 and pivoting connection 66 operatively connect indicator members 36, 38 and 40 to scale element 20.

Linkage II: Upper and lower connecting means 44 and 46 each have only a pivotal connection. Now upper sliding connection 68 is locked by tightening clamp screws 63, and a pivoting connection is provided in lower connecting means 46 by either loosening screw 76 so that its tip 76a is free to travel in annular groove 16a or by providing a shorter screw 76. Now, we have two spaced apart pivots 66 and 16 operatively connecting indicator members 36, 38 and 40 to respectively scale element 20 and base element 12.

Linkage A: Here, pivoting connection 66 and pin 16 are located coaxial with the axis of link 42, as illustrated in FIG. 1.

Linkage B: Here, upper pivoting connection 66 is coaxial with the axis of link 42, as shown in FIG. 1, while the axis of pin 16 in lower connecting means 46 is offset relative to the axis of link 42. Any suitable amount of offset desired is easily achieved by loosening clamp screw 73 in FIG. 3, sliding housing 70 relative to sleeve 72 by dovetails 70a and 72a as an adjustment means to move lower connecting means non-parallel to the axis of link 42 to a different position of offset relative to that link axis, and then tightening clamp screw 73 to lock this new position.

Hence, we can pick any of four different conditions:
Linkage IA, linkage IB, linkage IIA, or linkage IIB and --.

PO-1050
(5/69)

UNITED STATES PATENT OFFICE
CERTIFICATE OF CORRECTION

Patent No. 3,473,387      Dated October 21, 1969

Inventor(s) _____ Meriam     (page 2 of 2)

It is certified that error appears in the above-identified patent and that said Letters Patent are hereby corrected as shown below:

Column 7, line 63, "form" should be --worm--; line 75, "actuely" should be --acutely--. Column 8, line 19, "I claim" should be --CLAIMS--; line 73, "part" should be --apart--. Column 9, line 35, "said element" should be --said scale element--; line 51, "and axis" should be --an axis--. Column 10, line 6, "claim 9" should be --claim 4--; line 63, "as points" should be --at points--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents